United States Patent [19]

Narishima et al.

[11] Patent Number: 4,703,160
[45] Date of Patent: Oct. 27, 1987

[54] CASING STRUCTURE OF PORTABLE ELECTRONIC APPLIANCE

[75] Inventors: Wataru Narishima; Shoji Takeuchi, both of Tokyo, Japan

[73] Assignee: Texas Instruments Incorporated, Dallas, Tex.

[21] Appl. No.: 872,291

[22] Filed: Jun. 9, 1986

[30] Foreign Application Priority Data

Jun. 14, 1985 [JP] Japan .................... 60-129402

[51] Int. Cl.$^4$ ............................... G06C 5/02
[52] U.S. Cl. ................... 235/1 D; 200/5 A; 206/305; 220/339; 364/708
[58] Field of Search ............ 235/1 D; 206/305; 220/339; 150/52 R; 200/5 A; 361/398; 364/705, 708, 900

[56] References Cited

U.S. PATENT DOCUMENTS

| | | | |
|---|---|---|---|
| 4,028,509 | 6/1977 | Zurchen | 200/5 A |
| 4,044,980 | 8/1977 | Cummins | 220/339 X |
| 4,066,851 | 1/1978 | White et al. | 200/5 A |
| 4,068,924 | 1/1978 | Kotani | 235/1 D X |
| 4,075,702 | 2/1978 | Davies | 206/305 X |
| 4,096,577 | 6/1978 | Ferber et al. | 361/398 X |
| 4,259,568 | 3/1981 | Dynesen | 235/1 D |
| 4,314,117 | 2/1982 | Ditzig | 361/398 X |
| 4,336,529 | 6/1982 | Buan | 200/5 A X |
| 4,517,660 | 5/1985 | Fushimoto et al. | 200/5 A X |

*Primary Examiner*—Benjamin R. Fuller
*Attorney, Agent, or Firm*—Richard Bachand; Melvin Sharp; Rhys Merrett

[57] ABSTRACT

A unital casing structure of a portable electronic appliance such as a handheld or desktop calculator, comprising at least two panel sections having a straight boundary line therebetween and integrally coupled together across the boundary line whereby the panel sections are foldable with respect to each other about an axis extending along the boundary line between the panel sections so that the two panel sections are coupled together in a face-to-face relationship. The casing structure may further comprise an intermediate panel section bridging the two panel sections, the intermediate panel section being angularly movable with respect to the two panel sections about two axes parallel with and spaced apart across the boundary line between the panel section and being foldable with respect to each of the two panel sections about each of the two axes.

5 Claims, 10 Drawing Figures

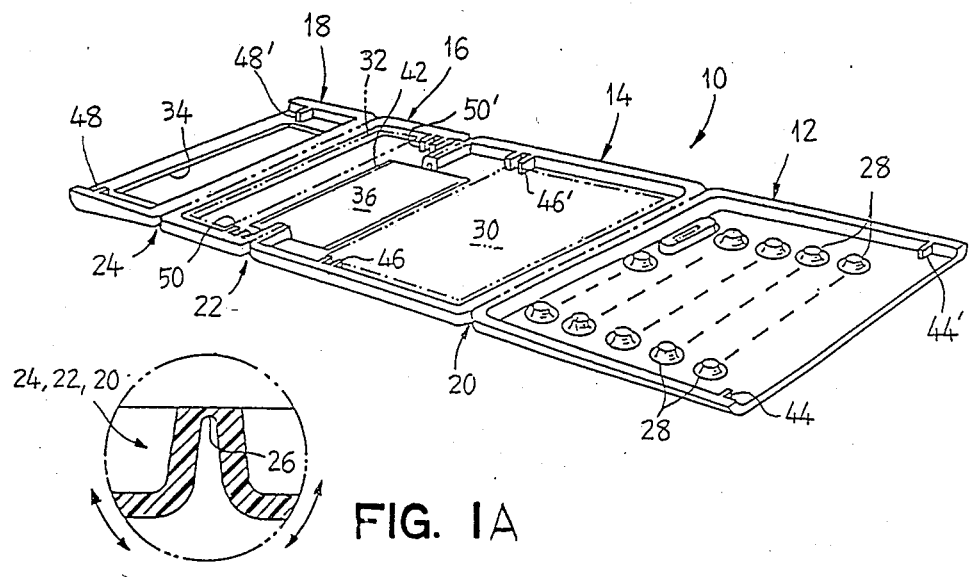
FIG. 1
FIG. 1A
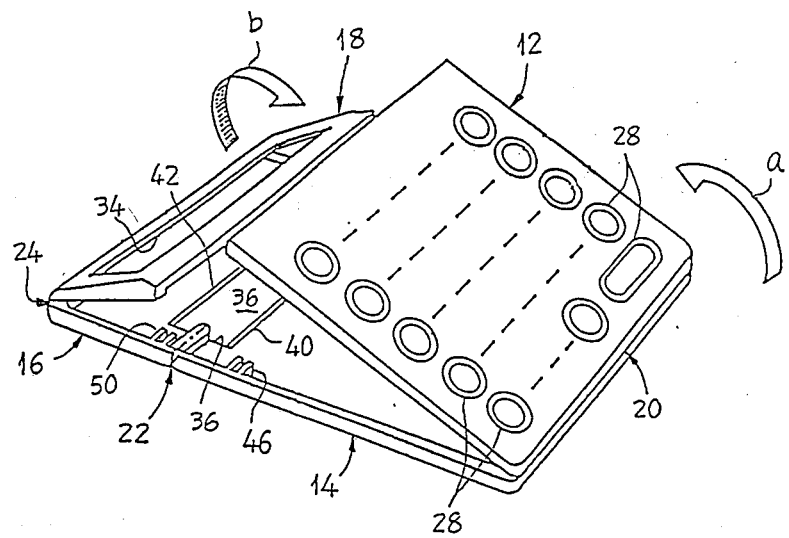
FIG. 2

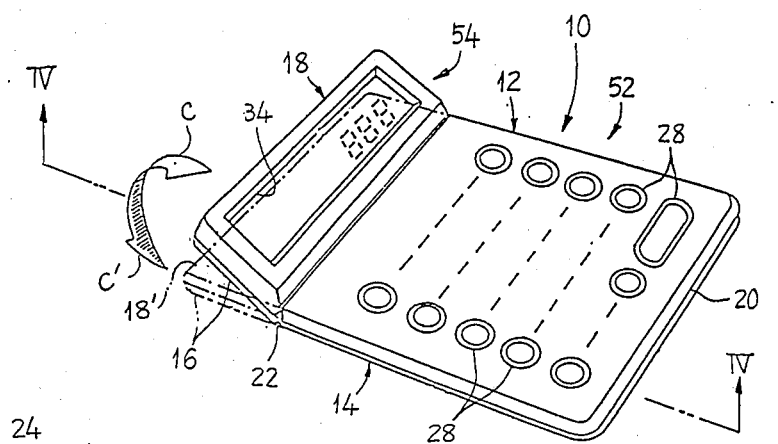
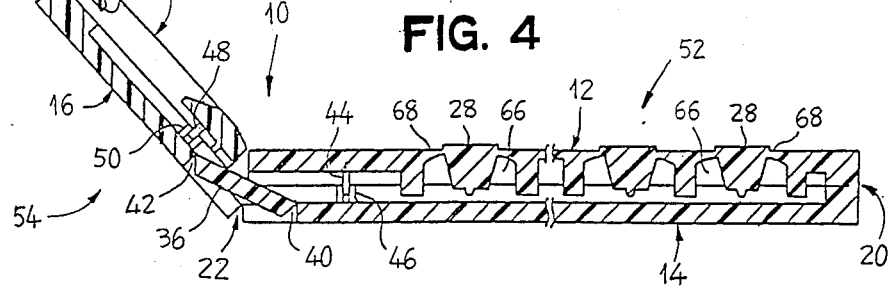
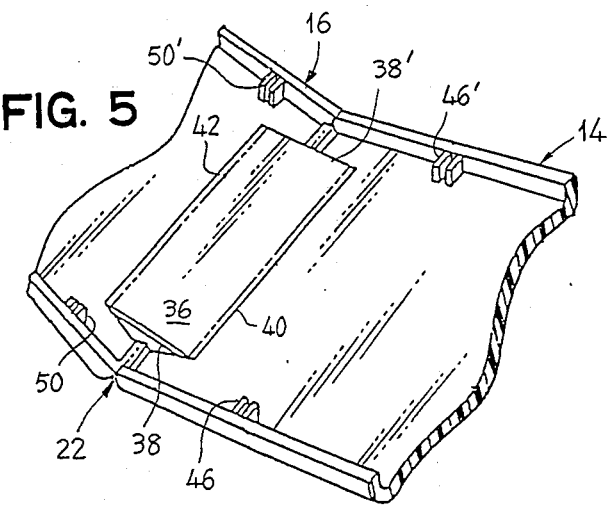

CASING STRUCTURE OF PORTABLE ELECTRONIC APPLIANCE

FIELD OF THE INVENTION

The present invention relates to portable electronic devices and, more particularly, to a unitary casing structure for a portable electronic appliance such as, typically, a handheld or desktop type electronic calculator having built-in keyboard and display assemblies.

BACKGROUND OF THE INVENTION

A handheld or desktop type calculator largely consists of a keyboard division including various alphanumerical and function keys and a display division for displaying numerals and signs. The casing structure of such an electronic appliance is ordinarily composed of at least two discrete, viz., originally separate component members which are coupled together. These component members may include two members which are formed separately of each other and which are fastened together by means of, for example, screws with a display unit and a key and switch-pad assembly encased between the two component members. The multi-piece construction of such a prior-art casing structure for a calculator requires a disproportionately large number of members in addition to the structural component members thereof. Various jigs as well as large amounts of time and labor are thus necessitated for the assembly of a calculator using such a casing structure. This inevitably results in low production efficiency and high production cost of electronic appliances such as handheld or desktop calculators.

It is accordingly an important object of the present invention to provide utmost ease of assembly and economy of production for the manufacture of a relatively small sized or portable-type electronic appliance such as, typically, a handheld or desktop calculator.

It is another important object of the present invention to provide a one-piece or totally unitary casing structure of a relatively small sized or portable-type electronic appliance such as a handheld or desktop calculator.

It is still another important object of the present invention to provide an improved casing structure of an electronic appliance, the casing structure being characterized by a totally unitary construction provided by integral panel sections coupled together by hinge connections to permit significant reduction in the number of the component members and elements in assembling the appliance.

SUMMARY OF THE INVENTION

In accordance with one important aspect of the present invention, there is provided a unitally casing structure of an electronic device, comprising at least two panel sections having a substantially straight boundary line therebetween, the panel sections being integrally coupled together across the boundary line and being foldable with respect to each other about an axis extending along the aforesaid boundary line so that the two panel sections are coupled together in a face-to-face relationship. The casing structure may further comprise an intermediate panel section bridging the two panel sections, the intermediate panel section being angularly movable with respect to the two panel sections about two axes substantially parallel with and spaced apart across the aforesaid boundary line and being foldable with respect to each of the two panel sections about each of the aforesaid two axes. In this instance, the casing structure according to the present invention may further comprise a thinned strip portion extending along a portion of the aforesaid boundary line and forming a first hinge connection between the two panel sections, a thinned strip portion extending along one of the aforesaid two axes and forming a second hinge connection between the intermediate panel section and one of the two panel sections, and a thinned strip portion extending along the other of the aforesaid two axes and forming a third hinge connection between the intermediate panel section and the other of the two panel sections, the two panel sections being coupled together through the first hinge connection so that the first hinge connection provides the axis about which the two panel sections are foldable with respect to each other, one of the two panel sections and the intermediate panel section being coupled together through the second hinge connection and being foldable with respect to each other about an axis provided by the second hinge connection, the other of the two panel sections and the intermediate panel section being coupled together through the third hinge connection and being foldable with respect to each other about an axis provided by the third hinge connection.

In accordance with another important aspect of the present invention, there is provided a unitally casing structure of an electronic device, comprising at least three panel sections which consist of first, second and third panel sections having substantially straight boundary lines therebetween, adjacent two of the panel sections being integrally coupled together across the boundary line between the two panel sections and being foldable with respect to each other about an axis extending along the boundary line therebetween so that the adjacent two panel sections are coupled together in a face-to-face relationship. Such a casing structure may further comprise an intermediate panel section bridging the second and third panel sections, the intermediate panel section being angularly movable with respect to the second and third panel sections about two axes substantially parallel with and spaced apart across the boundary line between the second and third panel sections and being foldable with respect to each of the second and third panel sections about each of the aforesaid two axes. In this instance, the casing structure may further comprise a thinned strip portion extending along one of the aforesaid two axes and forming a third hinge connection between the intermediate panel section and one of the second and third panel sections, and a thinned strip portion extending along the other of the aforesaid two axes and forming a fourth hinge connection between the intermediate panel section and the other of the second and third panel sections, one of the second and third panel sections and the intermediate panel section being coupled together through the third hinge connection and being foldable with respect to each other about an axis provided by the third hinge connection, the other of the second and third panel sections and the intermediate panel section being coupled together through the fourth hinge connection and being foldable with respect to each other about an axis provided by the fourth hinge connection.

BRIEF DESCRIPTION OF THE DRAWINGS

The features and advantages of a unitary casing structure according to the present invention will be more clearly appreciated from the following description taken in conjunction with the accompanying drawings in which like reference numerals designate similar or corresponding units, members and elements and in which:

FIG. 1 is a perspective view showing a preferred embodiment of a portable electronic appliance according to the present invention, the casing structure being assumed to be of a handheld or desktop calculator and being shown spread out flat on a horizontal plane;

FIG. 1A is a cross sectional view showing, to an enlarged scale, a preferred example of the cross sectional configuration of each of the hinge connections included in the casing structure illustrated in FIG. 1;

FIG. 2 is a perspective view showing the casing structure illustrated in FIG. 1, the casing structure being shown in the process of being folded into a complete assembly;

FIG. 3 is a perspective view also showing the casing structure illustrated in FIG. 1, the casing structure being shown having been folded into the complete assembly with its display division angularly raised with respect to the keyboard division (indicated by solid lines) or maintained flush with the keyboard division (indicated by phantom lines);

FIG. 4 is a longitudinal sectional view taken along line IV—IV in FIG. 3;

FIG. 5 is a fragmentary perspective view particularly showing the "living hinge mechanism" provided in the casing structure illustrated in FIGS. 1 to 4;

DESCRIPTION OF THE PREFERRED EMBODIMENTS

Figure 6:
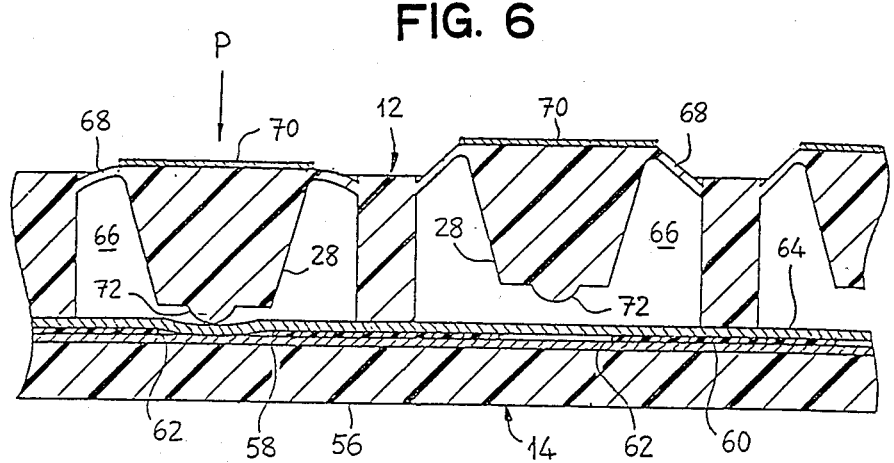
FIG. 6 is a fragmentary sectional view view showing a portion of the keyboard division, viz., portions of the key-top and switch-pad panel sections which form part of the casing structure illustrated in FIGS. 1 to 4.

Description will be hereinafter made with reference to the accompanying drawings in regard to the detailed construction of a unitary casing structure embodying the present invention. While the casing structure to be hereinafter described as embodying the present invention is useful for a handheld or desktop calculator (hereinafter referred to simply as calculator), a unitary casing structure according to the present invention may find application for any other types of portable electronic appliances having built-in keyboard and display divisions.

Referring first to FIG. 1 of the drawings, the casing structure embodying the present invention, represented in its entirety by reference numeral 10, has a one-piece or totally unitary construction and comprises a succession of panel sections each of which typically has a generally rectangular configuration. In the embodiment herein shown, the panel sections consist of a first or key-top panel section 12, a second or switch-pad panel section 14, a third or display housing panel section 16 and a fourth or display window panel section 18 which are coupled one to another along straight, parallel boundary lines extending between the adjacent panel sections laterally of the casing structure 10. Each of these component panel sections 12, 14, 16 and 18 of the casing structure 10 has inner and outer faces of which the inner face is shown directed upward in FIG. 1. The individual panel sections 12, 14, 16 and 18 are hingedly connected together as at 20 along the boundary line between the key-top and switch-pad panel sections 12 and 14, at 22 along the boundary line between the switch-pad and display housing panel sections 14 and 16, and at 24 along portions of the boundary line between the display housing and display window panel sections 16 and 18. As illustrated to an enlarged scale in FIG. 1A, each of these hinge connections 20, 22 and 24 is preferably implemented by a thinned narrow strip portion 26 or a series of such portions extending along each of the boundary lines between the adjacent panel sections 12, 14, 16 and 18. The casing structure 10 as a whole is constructed of a suitable electrically non-insulating, resilient material so that the thinned narrow strip portion or portions 26 thus formed between every adjacent two of the panel sections 12, 14, 16 and 18 provides an integral hinge joint allowing one of the two panel sections to flap or swing with respect to the other about an axis provided by the boundary line between the particular two panel sections. The key-top and switch-pad panel sections 12 and 14 are assumed to be generally congruent in plan with respect to each other and, likewise, the display housing and display window panel sections 16 and 18 assumed to be generally congruent in plan with respect to each other. The casing structure 10 is typically injection molded from an elastomer resin or a thermoplastic resin. The elastomer resin may be polyurethane or polyvinyl chloride, while the thermoplastic resin may be polycarbonate or acrylonitrile butadiene stryene copolymer (ABS).

As will be described in more detail, the key-top panel section 12 has a number of integral key portions to be manually depressed by finger pressures as generally indicated at 28 while the switch-pad panel section 14 has a switch pad structure installed thereon as schematically indicated at 30. On the other hand, the display housing panel section 16 has installed thereon a suitable form of display device such as typically a liquid crystal display structure as schematically indicated at 32 and the display window panel section 18 is formed with a window 34 to provide visual access to the liquid crystal display structure 32. As will also become apparent as the description proceeds, the casing structure 10 which in FIG. 1 is shown spread out flat on a horizontal plane is to be folded compactly into a complete assembly with the key-top panel section 12 turned to overlap the switch-pad panel section 14 and with the display window panel section 18 turned to overlap the display housing panel section 16 as will be seen from FIG. 2. The casing structure 10 being thus folded down, the key portions 28 which form part of the key-top panel section 12 are operatively associated with the switch pad structure 30 on the switch-pad panel section 14 against which the key-top panel section 12 is folded back.

The thinned narrow strip portion 26 forming each of the hinge connection 20 between the key-top and switch-pad panel sections 12 and 14 and the hinge connection 22 between the display housing and display window panel sections 16 and 18 extends substantially from one side of the casing structure 10 to the other. In contrast to these hinge connections 20 and 22, the hinge connection 21 provided between the switch-pad and display housing panel sections 14 and 16 is formed by a pair of thinned narrow strip portions 26 which are aligned with each other along the boundary line between the panel sections 14 and 16 and which terminate at relatively short distances from the opposite sides of the casing structure 10. Between the switch-pad and display housing panel sections 14 and 16 is provided an intermediate panel section 36 which is defined by a pair of a parallel side slits 38 and 38' and a pair of lateral hinge connections 40 and 42. The parallel side slits 38 and 38' extend in parallel with the sides of the casing structure 10 through the inboard ends of the two thinned narrow strip portions 26, respectively, forming the hinge connection 22 between the panel sections 14 and 16, while the lateral hinge connections 40 and 42 extend in parallel with the hinge connections 20, 22 and 24 between the panel sections 12, 14, 16 and 18. One lateral hinge connection 40 is provided between the intermediate panel section 36 and the switch-pad panel section 14 and allows the intemediate panel section 36 to turn about an axis provided by the hinge connection 40 and the other lateral hinge connection 42 is provided between the intermediate panel section 36 and the display housing panel section 16 and allows the intermediate panel section 36 to turn about an axis provided by the hinge connection 42. Each of the lateral hinge connections 40 and 42 thus provided for the intermediate panel section 36 is also preferably implemented by the thinned narrow strip portion 26 illustrated in FIG. 1A. The two thinned narrow strip portions 26 respectively forming these hinge connections 40 and 42 terminate at the side slits 38 and 38', respectively. The combination of the hinge connection 22 formed between the switch-pad and display housing panel sections 14 and 16 and the hinge connections 40 and 42 thus formed along the intermediate panel section 36 provides a hinge mechanism known as "living hinge" mechanism and forms a "flex neck" structure between the switch-pad and display housing panel sections 14 and 16.

A casing structure according to the present invention further comprises releasable fastening means through which the key-top panel section 12 is to be releasably coupled to the switch-pad panel section 14 and releasable fastening means through which the display window panel section 18 is to be coupled to the display housing panel section 16. In the embodiment herein shown, the releasable fastening means for the panel sections 12 and 14 comprises a pair of projections 44 and 44' formed on the inner face of the key-top panel section 12 and located adjacent the opposite sides, respectively, of the panel section 12 and a pair of grooved snap portions 46 and 46' formed on the inner face of the switch-pad panel section 14 and located to be aligned with the projections 44 and 44', respectively, when the key-top panel section 12 is folded back against the switch-pad panel section 14. Similarly, the releasable fastening means for the panel sections 16 and 18 comprises a pair of projections 48 and 48' formed on the inner face of the display window panel section 18 and located adjacent the opposte sides, respectively, of the panel section 18 and a pair of grooved snap portions 50 and 50' formed on the inner face of the display housing panel section 16 and located to be aligned with and receive therein the projections 48 and 48', respectively, when the display window panel section 18 is folded back against the display housing panel section 16. It will be apparent that, alternatively, the projections 44 and 44' may be provided on the switch-pad panel section 14 with the grooved snap portions 46 and 46' provided on the key-top panel section 12 and, likewise, the projections 48 and 48' may be provided on the display housing panel section 16 with the grooved snap portions 50 and 50' provided on the display window panel section 18, if desired. The releasable fastening means thus composed of the combinations of the projections and grooved snap portions are merely by way of example and may thus be replaced with any other forms of mechanical coupling means such as screws or studs or, alternatively, the panel sections may be unseparably connected together by fusion, welding or bonding with an adhesive.

The casing structure 10 constructed as hereinbefore described is folded down into a complete assembly ready for use, as illustrated in part by solid lines and in part by phantom lines in FIG. 3 of the drawings. For this purpose, the key-top panel section 12 is folded back onto the switch-pad panel section 14 about the axis provided by the hinge connection 20 between the panel sections 12 and 14 as indicated by arrow a in FIG. 2 and, likewise, the display window panel section 18 is folded back onto the display housing panel section 16 about the axis provided by the hinge connection 22 between the panel sections 16 and 18 as indicated by arrow b in FIG. 2. With the key-top panel section 12 folded back to overlap the switch-pad panel section 14 and with the display window panel section 18 folded back to overlap the display housing panel section 16, the projections 44 and 44' on the key-top panel section 12 are snapped into the grooves in the snap portions 46 and 46', respectively, of the switch-pad panel section 14 and, likewise, the projections 48 and 48' on the display window panel section 18 snapped into the grooves in the snap portions 50 and 50', respectively, of the display housing panel section 16, as will be seen from FIG. 4 of the drawings. The key-top and switch-pad panel sections 12 and 14 are thus coupled together in a face-to-face relationship and, likewise, the display housing and display window panel sections 16 and 18 coupled together also in a face-to-face relationship. The calculator now has a keyboard division including the key portions 28 forming part of the key-top panel section 12 and the switch pad structure 30 installed on the switch-pad panel section 14 and a display division 54 including the liquid crystal structure 32 installed on the display housing panel section 14 and the window 34 provided in the display window panel section 18.

The casing structure 10 folded down as above described has at this stage a simple box-shaped configuration having totally flat upper and lower surfaces with its display housing and display window panel sections 16 and 18 flush with the key-top and switch-pad panel sections 12 and 14, respectively, as indicated in phantom in FIG. 3. The casing structure 10 proposed by the present invention can then be further deformed so that the display division 54 of the calculator is bent or angularly raised with respect to the keyboard division 52 from the position indicated by the phantom lines to the position indicated by solid lines in FIG. 3. To this end, the display housing and display window panel sections 16 and 18 providing the display division 54 of the calculator are forced to turn as a single unit about an axis provided by the hinge connection 22 between the switch-pad and display housing panel sections 14 and 16 in a direction as indicated by arrowhead c in FIG. 3. The panel sections 16 and 18 are thus caused to tilt from the positions flush with the key-top and switch-pad panel sections 12 and 14, respectively, finally to positions inclined with respect to the panel sections 12 and 14, respectively, as indicated by solid lines in FIG. 3. As the display housing panel section 16 is turned in the direction of arrowhead c about the axis provided by the hinge connection 22 between the switch-pad and display housing panel sections 14 and 16, the intermediate panel section 36 bridging the panel sections 14 and 16 is forced to turn in one direction with respect to the panel section 14 about an axis provided by the hinge connection 40 between the panel sections 14 and 36 and in the other direction with respect to the display housing panel section 16 about an axis provided by the hinge connection 42 between the panel sections 16 and 36 as will be best seen from FIG. 5 of the drawings. The intermediate panel section 36 is caused to tilt into the position angled with respect to both of the panel sections 14 and 16 at the hinge connections 40 and 42 as will be seen from FIGS. 3 and 4. The intermediate panel section 36 thus inclined with respect to the panel sections 14 and 16 is maintained in the inclined position to maintain the display division 54 of the calculator in a position inclined at a certain angle with respect to the keyboard division 52 unless an external force is applied to the display division 54 attempting to move the display division 54 back to the position flush with the keyboard division 52. The display division 54 inclined with respect to the keyboard division 52 of the calculator will provide easy of visual access to the display particularly when the calculator is used on a desk top. The intermediate panel section 36 is moved into the inclined position momentarily with a snap action achieved by the living hinge mechanism provided by the combination of the hinge connections 22, 40 and 42. Such a snap action of the intermediate panel section 36 will offer the user of the calculator a feeling of control over the movement of the display division 54 with respect to the keyboard division 52 of the calculator. The angle at which the display division 54 is to be inclined with respect to the keyboard division 52 of the calculator can be varied by selecting the distance between the hinge connections 40 and 42 across the intermediate panel section 36 relative to the measurements of the panel sections 14 and 16 in a direction perpendicular to the hinge connections of the casing structure 10. When the calculator is to be left out of use, the display division 54 thereof may be turned back to the position flush with the keyboard division 52 of the calculator as indicated by arrowhead c' in FIG. 3.

Description will be hereinafter made regarding the detailed construction of the key-top and swtich-pad panel sections 12 and 14 providing the keyboard division 52 of the casing structure 10 embodying the present invention.

As shown in FIG. 4 and will be better seen from FIG. 6 of the drawings, the switch-pad panel section 14 comprises an electrically insulating flat base plate 56 having an electrically conductive film 58 on the upper face of the plate 56. The conductive film 58 is typically patterned to form a printed circuit having various switch contact regions (not shown) printed on the base plate 56 as well known in the art. To the upper surface of this patterned conductive film 58 is an electrically insulating spacer film 60 of, for example, a Mylar polyester formed with a number of apertures 62 allowing the conductive film 58 to be exposed therethrough. The apertures 62 in the spacer film 60 are respectively located on the switch contact regions of the conductive film 56. The insulating spacer film 60 in turn is covered with a flexible, electrically conductive film 64 which is to flex into contact with the patterned lower conductive film 58 through any of the apertures 62 in the spacer film 60.

Figure 7A:
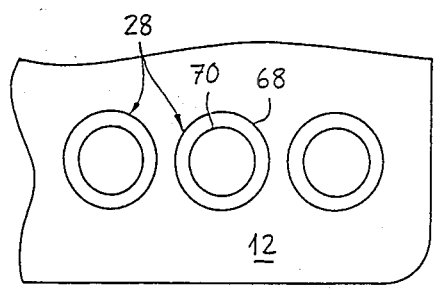
FIG. 7A is a fragmentary plan view showing a portion of the outer face of the key-top panel section which forms part of the casing structure shown in FIGS. 1 to 4.
Figure 7B:
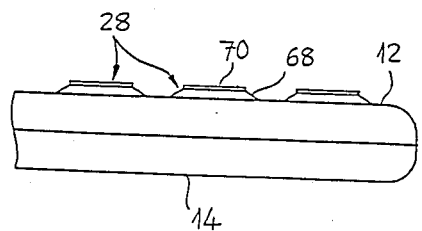
FIG. 7B is a fragmentary side elevation view showing that portion of the casing structure which is illustrated in FIG. 7A.

On the other hand, the key-top panel section 12 of the casing structure 10 is formed with a plurality of relatively shallow, generally cylindrical concavities 66 which are open toward the switch-pad panel section 14 and which are located over the individual apertures 62, respectively, in the spacer film 60. The key-top panel section 12 thus has integral partition wall portions defining the concavities 66 and further has generally frusto-conical, viz., truncated-cone-shaped portions merging out of these partition wall portions through thinned annular skirt portions 68. These frusto-conical portions of the key-top panel section 12 constitute the previously mentioned key portions 28 (FIGS. 1 to 3) and have their upper ends concentrically encircled by the respectively associated thinned skirt portions 68. The frusto-conical key portions 28 are directed toward the flexible upper conductive film 64 forming part of the switch-pad panel section 14 and are respectively located in alignment with the apertures 62 in the insulating spacer film 60 of the panel section 14. Each of the thinned annular skirt portions 68 normally has an angularly raised position over the upper conductive film 62 to have the associated key portion 28 spaced apart upward from the film 62 and is resiliently deformable with respect to the partition wall portions of the panel section 12 to allow the associated key portion 28 for movement into and out pressing contact with the upper conductive film 64. Each of the key portions 28 typically has an alphanumerical indicia 70 borne on its upper face and preferably has at its bottom a small hemispherical protrusion 72 directed toward the upper conductive film 64. As will be better seen from FIGS. 7A and 7B of the drawings, the key portions 28 thus having the indicia 70 on their upper faces slightly protrude above the upper or outer face of the key-top panel section 12 when the key portions 28 held spaced apart from the film 62.

When any one of the key portions 28 is depressed with a finger pressure applied thereto as indicated by arrow P in FIG. 6, the particular key portion 28 is forced to move into the upper conductive film 64 against the resilient opposing force exerted by the associated skirt portion 68, as is the case with the key portion shown to the left of FIG. 6. The particular key portion 28 being thus brought into pressing contact with the upper conductive film 64, that portion of the conductive film 64 which is being engaged by the key portion 28 is forced to flex into contact with the associated contact region of the lower conductive film 58 through the associated aperture 62 in the spacer film 60. This provides electrical contact between the upper conductive film 64 and the particular contact region of the patterned lower conductive film 58. When the key portion 28 under consideration is then released from the finger pressure, the key portion 28 is allowed to restore its initial position with respect to the partition wall portions of the panel section 12 by the resiliency of the associated thinned skirt portion 68 of the panel section 12. The distance of stroke of each of the key portions 28 which are thus moved into and out of contact with the upper conductive film 64 is thus dictated by the spring characteristics, viz., the geometry of the thinned skirt portion 68 integral with the key portion 28.

While the casing structure 10 embodying the present invention has hereinbefore been assumed to be largely composed of a total of five panel sections including the intermediate panel section 36, a casing structure according to the present invention may comprise at least four panel sections including a panel section similar to the intermediate panel section 36 providing the living hinge mechanism in the described embodiment.

Figure 8:
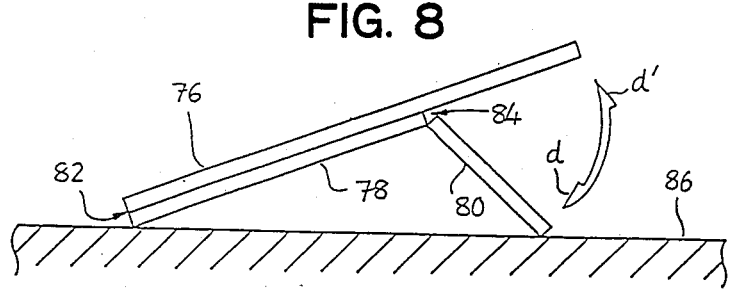
FIG. 8 is a schematic side elevation view showing another preferrred embodiment of a casing structure of a portable electronic appliance according to the present invention, the casing structure being shown having been folded down into a complete assembly ready for use.

FIG. 8 of the drawings schematically shows such an embodiment of a casing structure of an electronic appliance according to the present invention. The casing structure, now represented in its entirety by reference numeral 74 herein shown thus largely comprises a first panel section 76, a second panel section 78, and a third 80 which are coupled one to another along straight, parallel boundary lines extending between the adjacent panel sections laterally of the casing structure 74. Though not shown, the first panel section 76 may include or have incorporated therein keys and a display device while the second panel section 78 may be similar to the switch-pad panel section 14 in the embodiment of FIGS. 1 to 5 and may have a switch pad installed therein. These component panel sections 76, 78 and 80 of the casing structure 74 are hingedly connected together as at 82 along the boundary line between the first and second panel sections 76 and 78 and at 84 along the boundary line between the second and third panel sections 78 and 80. Each of these hinge connections 82 and 84 is also preferably implemented by a thinned narrow strip portion 26 or a series of such portions as shown in FIG. 1A so that the thinned narrow strip portion or portions 26 thus formed between every adjacent two of the panel sections 76, 78 and 80 provides an integral hinge joint allowing one of the two panel sections to flap or swing with respect to the other about an axis provided by the boundary line between the particular two-panel sections. Between the second and third panel sections 78 and 80 is provided an intermediate panel section which is defined by a pair of parallel side slits and a pair of lateral hinge connections similarly to the intermediate panel section 36 providing the living hinge mechanism in the embodiment described with reference to FIGS. 1 to 5, though not shown in FIG. 8.

The casing structure 74 is folded down into a complete assembly with the first panel section 76 turned onto the second panel section 78 about an axis provided by the hinge connection 82 between the panel sections 76 and 78. The casing structure 74 can then be further deformed so that the third panel section 80 thereof is bent or angularly moved away from the first panel section 76 about an axis provided by the hinge connection 84 as indicated by arrowhead d. As the third panel section 80 is thus turned in the direction of arrowhead c about the axis provided by the hinge connection 84, the intermediate panel section which bridges the second and third panel sections 78 and 80 is forced to turn with respect to both of the panel sections 78 and 80. The intermediate panel section thus inclined with respect to the second and third panel sections 78 and 80 maintains the third panel section 80 in the position inclined at a certain angle with respect to the first panel section 76 unless an external force is applied to the third panel section 80 attempting to move the panel section 80 back to the position flush with the second panel section 78. The electronic appliance having the third panel section 80 thus inclined with respect to the first and second panel sections 76 and 78 can be placed in a tilted position on top of a desk 86 as shown, thereby providing ease of viewing the keys and display on the first panel section 76. When the appliance is to be left out of use, the third panel section 80 thereof may be turned back to the position flush with the second panel section 78.

As will have been seen from the foregoing description a casing structure according to the present invention is characterized, inter alia, in that a one-piece or totally unitary construction is provided by integral panel sections coupled together by hinge connections. Such construction will permit significant reduction in the number of the component members and elements in assembling a relatively small sized or portable-type electronic applicance such as a handheld or desktop calculator and will thus provide utmost ease of assembly and economy of production during manufacture of the appliance.

What is claimed is:

1. A unital casing structure in combination with a portable calculator, comprising
    at least four panel sections having substantially straight boundary lines therebetween and including a key-top panel section having a plurality of integral key portions, a switch-pad panel section having a switch pad structure installed thereon, a display housing panel section having a display device installed thereon, and a display window panel section formed with a window providing visual access to the display device,
    adjacent two of said key-top, switch-pad, display housing and display window panel sections being integrally coupled together across the boundary line between the two panel sections and being foldable with respect to each other about an axis extending along the boundary line therebetween so that the adjacent two panel sections are coupled together in a face-to-face relationship to provide a keyboard division by the combination of the key-top and switch-pad panel sections which are folded against each other and a display division by the combination of the display housing and display window panel sections which are folded against each other.

2. A unital casing structure as set forth in claim 1, further comprising
    a thinned strip portion extending along at least a portion of the boundary line between said key-top and switch-pad panel sections and forming a first hinge connection therebetween,
    a thinned strip portion extending along a portion of the boundary line between said switch-pad and display housing panel sections and forming a second hinge connection therebetween,
    a thinned strip portion extending along a portion of the boundary line between said display housing and display window panel sections and forming a third hinge connection therebetween,
    said key-top and switch-pad panel sections being coupled together through said first hinge connection so that the first hinge connection provides the axis about which said key-top and switch-pad panel sections are foldable with respect to each other,
    said switch-pad and display housing panel sections being coupled together through said second hinge connection so that the second hinge connection provides the axis about which said switch-pad and display housing panel sections are foldable with respect to each other, said display housing and display window panel sections being coupled together through said third hinge connection so that the third hinge connection provides the axis about which said display housing and display window panel sections are foldable with respect to each other.

3. A unital casing structure as set forth in claim 1, further comprising an intermediate panel section bridging said switch-pad and display housing panel sections, said intermediate panel section being angularly movable with respect to the switch-pad and display housing panel sections about two axes substantially parallel with and spaced apart across the boundary line between the swtich-pad and display housing panel sections and being foldable with respect to each of the switch-pad and display housing panel sections about each of said two axes.

4. A unital casing structure as set forth in claim 3, further comprising a thinned strip portion extending along one of said two axes and forming a fourth hinge connection between said intermediate panel section and one of said switch-pad and display housing panel sections, and a thinned strip portion extending along the other of said two axes and forming a fifth hinge connection between said intermediate panel section and the other of said switch-pad and display housing panel sections, one of said switch-pad and display housing panel sections and said intermediate panel section being coupled together through said fourth hinge connection and being foldable with respect to each other about an axis provided by the fourth hinge connection.

the other of said switch-pad and display housing panel sections and said intermediate panel section being coupled together through said fifth hinge connection and being foldable with respect to each other about an axis provided by the fifth hinge connection.

5. A unital casing structure as set forth in claim 4, in which said intermediate panel section is defined by said fourth and fifth hinge connections and a pair of substantially parallel slits extending substantially at right angles to the fourth and fifth hinge connections.

* * * * *